United States Patent
Uchida et al.

(10) Patent No.: US 10,883,587 B2
(45) Date of Patent: Jan. 5, 2021

(54) DIFFERENTIAL DEVICE

(71) Applicant: MUSASHI SEIMITSU INDUSTRY CO., LTD., Toyohashi (JP)

(72) Inventors: Akihiro Uchida, Toyohashi (JP); Yoichi Yanase, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 16/692,668

(22) Filed: Nov. 22, 2019

(65) Prior Publication Data

US 2020/0166111 A1 May 28, 2020

(30) Foreign Application Priority Data

Nov. 27, 2018 (JP) ................................. 2018-220941

(51) Int. Cl.
*F16H 48/38* (2012.01)
*B60K 17/346* (2006.01)

(52) U.S. Cl.
CPC ......... *F16H 48/38* (2013.01); *B60K 17/3462* (2013.01); *F16H 2048/382* (2013.01); *F16H 2048/385* (2013.01)

(58) Field of Classification Search
CPC ................. F16H 48/38; F16H 17/3462; F16H 2048/385; B60K 17/3462
See application file for complete search history.

(56) References Cited

U.S. PATENT DOCUMENTS

| | | | | |
|---|---|---|---|---|
| 6,379,277 | B1 * | 4/2002 | Victoria | F16H 48/08 475/231 |
| 6,699,154 | B2 * | 3/2004 | Orr | F16H 48/08 475/230 |
| 2001/0039228 | A1 * | 11/2001 | Eulenstein | F16H 48/08 475/230 |
| 2002/0040613 | A1 * | 4/2002 | Brooks | F16H 1/12 74/423 |
| 2006/0063633 | A1 * | 3/2006 | Turner | F16H 57/0447 475/220 |
| 2009/0266198 | A1 * | 10/2009 | Nosakowski | F16H 48/08 74/606 R |

(Continued)

FOREIGN PATENT DOCUMENTS

JP  2018-132174 A  8/2018

*Primary Examiner* — David M Fenstermacher
(74) *Attorney, Agent, or Firm* — Carrier Blackman & Associates, P.C.; Joseph P. Carrier; Anne G. Sabourin

(57) ABSTRACT

A differential device includes a ring gear receiving a rotational driving force from a drive gear, a differential case rotating integrally with the ring gear around a predetermined axis, and a differential mechanism installed within a barrel part of the differential case. The ring gear includes a gear portion meshing with the drive gear, and a rim portion that is formed integrally with an inner periphery of the gear portion and is fitted, in a non-welded state, onto a maximum diameter outer peripheral portion of the barrel part or a predetermined outer peripheral portion having a smaller diameter than the maximum diameter outer peripheral portion. The rim portion has a to-be-fixed portion welded to the barrel part at a position spaced in an axial direction from a fitting part via which the rim portion and the barrel part are fitted, the position being further radially inward than the fitting part.

18 Claims, 3 Drawing Sheets

(56) References Cited

U.S. PATENT DOCUMENTS

| | | | |
|---|---|---|---|
| 2010/0218632 A1* | 9/2010 | Sasaki | F16D 13/74 74/416 |
| 2014/0013886 A1* | 1/2014 | Weber | F16H 57/0423 74/417 |
| 2015/0024897 A1* | 1/2015 | Szuba | B21D 22/16 475/230 |
| 2015/0354691 A1* | 12/2015 | Keeney | F16H 57/0483 74/607 |

* cited by examiner c > b > a

DIFFERENTIAL DEVICE

BACKGROUND OF THE INVENTION

Field of the Invention

The present invention relates to a differential device, particularly, a differential device comprising a ring gear that receives a rotational driving force from a drive gear connected to a power source, a differential case that rotates integrally with the ring gear around a predetermined axis, and a differential mechanism that is installed within a barrel part of the differential case, the differential mechanism being capable of distributing between a pair of drive shafts the rotational driving force that has been transmitted from the drive gear to the differential case via the ring gear while allowing differential rotation.

In the present invention and the present specification, 'axial direction' means the direction along a rotational axis of the differential case (the predetermined axis) unless otherwise specified, and 'radial direction' means the direction of a radius having as a center line the rotational axis of the differential case (the predetermined axis) unless otherwise specified.

Description of the Related Art

Such a differential device is known as disclosed in Japanese Patent Application Laid-open No. 2018-132174.

In the differential device described in Japanese Patent Application Laid-open No. 2018-132174, an inward-facing flange extending radially inward from the inner periphery of a rim portion of a ring gear is integrally and projectingly provided, and this inward-facing flange and an outward-facing flange extending radially outward from the outer periphery of a barrel part of a differential case are joined (for example, joined by a bolt).

In such a conventional structure via which a ring gear and a differential case are joined to each other, in order to sufficiently reduce the diameter of the ring gear, for example, eliminating the inward-facing flange of the ring gear and directly fitting and welding the inner periphery of the rim portion of the ring gear to the outer periphery of the barrel part of the differential case could be considered, but in this case due to the close positional relationship of a gear portion of the ring gear with a weld part, the gear portion is greatly affected by thermal distortion due to welding, and this might become a main cause of degradation in the strength and durability of the gear portion.

SUMMARY OF THE INVENTION

The present invention has been proposed in light of the above circumstances, and it is an object thereof to provide a differential device that can solve the problems of the conventional device with a simple structure.

In order to achieve the object, according to a first aspect of the present invention, there is provided a differential device comprising a ring gear that receives a rotational driving force from a drive gear connected to a power source, a differential case that rotates integrally with the ring gear around a predetermined axis, and a differential mechanism that is installed within a barrel part of the differential case, the differential mechanism being capable of distributing between a pair of drive shafts the rotational driving force that has been transmitted from the drive gear to the differential case via the ring gear while allowing differential rotation, wherein the ring gear comprises a gear portion that meshes with the drive gear, and a rim portion that is formed integrally with an inner periphery of the gear portion and is fitted, in a non-welded state, onto a maximum diameter outer peripheral portion of the barrel part or a predetermined outer peripheral portion having a smaller diameter than the maximum diameter outer peripheral portion, and the rim portion has a to-be-fixed portion that is welded to the barrel part at a position that is spaced in an axial direction from a fitting part via which the rim portion and the barrel part are fitted, the position being further radially inward than the fitting part.

In accordance with the first aspect of the present invention, since the ring gear includes the gear portion and the rim portion, which is formed integrally with the inner periphery of the gear portion and is fitted, in a non-welded state, onto the maximum diameter outer peripheral portion of the barrel part of the differential case or the predetermined outer peripheral portion having a smaller diameter than the maximum diameter outer peripheral portion, and the rim portion has the to-be-fixed portion, which is welded to the barrel part at a position that is spaced in the axial direction from the fitting part via which the rim portion and the barrel part are fitted and is further radially inward than the fitting part, even if in order to reduce the diameter of the ring gear the inner periphery of the rim portion is fitted directly around the outer periphery of the barrel part of the differential case, the gear portion can be spaced from the weld part between the ring gear and the differential case, it becomes possible to suppress the influence of thermal distortion due to welding on the gear portion, and it thereby becomes possible to achieve a small diameter for the differential case equipped with the ring gear while suppressing any degradation in terms of strength and durability of the gear portion caused by thermal distortion. Moreover, it is possible to decrease the welded area between the differential case and the ring gear, thus contributing to a reduction in cost and an improvement in productivity.

According to a second aspect of the present invention, in addition to the first aspect, the barrel part has a recess part that is positioned further radially inward than a weld part via which the to-be-fixed portion and the barrel part are welded and is recessed inward in an axial direction of the barrel part.

In accordance with the second aspect of the present invention, since the barrel part of the differential case has the recess part, which is positioned further radially inward than the weld part between the barrel part and the to-be-fixed portion of the rim portion and is recessed inward in the axial direction of the barrel part, an area around the recess part on the outer periphery of the barrel part (in particular, between the recess part and the weld part) easily undergoes elastic deformation, thermal distortion due to shrinkage after welding can thus be absorbed, and the influence of thermal distortion on the gear portion can be further lessened.

According to a third aspect of the present invention, in addition to the second aspect, when an axial width of the weld part is defined as a and an axial depth of the recess part from an outer end in the axial direction of the weld part is defined as b, the axial width and the axial depth are set so that $b > a$ holds.

In accordance with the third aspect of the present invention, when the axial width of the weld part is defined as a and the axial depth of the recess part from the axially outer end of the weld part is defined as b, since $b > a$ holds, it is possible to set the recess part sufficiently deeply with respect to the axial width of the weld part, the area around the recess part easily undergoes elastic deformation, and the influence of thermal distortion on the gear portion can be further lessened.

According to a fourth aspect of the present invention, in addition to the first aspect, the ring gear has a tooth shape such that the ring gear receives a thrust load in the axial direction due to the gear portion and the drive gear meshing with each other, a weld part of the to-be-fixed portion and the barrel part is spaced from the fitting part in the axial direction, a cavity part is formed between the weld part and the fitting part so as to be sandwiched by the barrel part and the rim portion, and a cavity-forming face portion, facing the cavity part, of an outer peripheral face of the barrel part is formed as a continuous face that continues smoothly from an inner end in the axial direction of the weld part to the fitting part.

In accordance with the fourth aspect of the present invention, since the ring gear has a tooth shape such that it receives a thrust load due to it meshing with the drive gear, the weld part of the to-be-fixed portion of the rim portion and the barrel part is spaced from the fitting part in the axial direction, the cavity part is formed between the weld part and the fitting part so as to be sandwiched by the barrel part and the rim portion, and the cavity-forming face portion of the outer peripheral face of the barrel part is formed as a continuous face that continues smoothly from the inner end in the axial direction of the weld part to the fitting part, it is possible to suppress the occurrence of stress concentration caused by a thrust load in the vicinity of the cavity-forming face portion on the outer periphery of the barrel part.

According to a fifth aspect of the present invention, in addition to the second or third aspect, the weld part is spaced in the axial direction from the fitting part, a cavity part is formed between the weld part and the fitting part so as to be sandwiched by the barrel part and the rim portion, and the cavity part and the recess part are formed so that at least parts thereof in an axial range overlap each other.

In accordance with the fifth aspect of the present invention, since the cavity part and the recess part are formed so that at least parts of the axial ranges thereof overlap one another, the thin part having the smallest thickness between the cavity-forming face portion on the outer peripheral face of the barrel part and the inner face of the recess part easily undergoes elastic deformation as a result of the thermal distortion due to shrinkage after welding, the thermal distortion due to shrinkage after welding can be absorbed, and the influence of thermal distortion on the gear portion can be further lessened.

According to a sixth aspect of the present invention, in addition to any one of the first to fifth aspects, a weld part of the to-be-fixed portion and the barrel part is spaced from the fitting part in the axial direction, a cavity part is formed between the weld part and the fitting part so as to be sandwiched by the barrel part and the rim portion, a cavity-forming face portion, facing the cavity part, of an outer peripheral face of the barrel part has a first flat face portion that extends radially inward from the inner end in the axial direction of the weld part and is substantially orthogonal to the predetermined axis, a cavity-forming face portion, facing the cavity part, of an inner peripheral face of the rim portion has a second flat face portion that extends radially outward from the inner end in the axial direction of the weld part and is substantially orthogonal to the predetermined axis, the barrel part and the rim portion each have, in an area around the weld part, a heat-affected portion that is hardened by an input of heat when welding, and the first and second flat face portions are formed so as to include all of a region, facing the cavity part, of the heat-affected portion.

In accordance with the sixth aspect of the present invention, the cavity-forming face portion on the outer peripheral face of the barrel part has the first flat face portion, which extends radially inward from the axially inner end of the weld part and is substantially orthogonal to the predetermined axis, the cavity-forming face portion on the inner peripheral face of the rim portion has the second flat face portion, which extends radially outward from the axially inner end of the weld part and is substantially orthogonal to the predetermined axis, the barrel part and the rim portion have, in the area around the weld part therebetween, the heat-affected parts respectively, which are hardened by the input of heat when welding, and the first and second flat face portions are formed so as to include all the region, facing the cavity part, of the heat-affected parts. Since the heat-affected part and the weld part are thus not provided with an inflection point or a step that would primarily cause a concentration of stress, it is possible to prevent effectively any damage starting at the heat-affected part or the weld part.

According to a seventh aspect of the present invention, in addition to the sixth aspect, the ring gear has a tooth shape such that the ring gear receives a thrust load in the axial direction due to the gear portion and the drive gear meshing with each other, the cavity-forming face portion of the outer peripheral face of the barrel part has the first flat face portion, a first curved face portion with a recess shape connected to the first flat face portion, and a second curved face portion with a recess shape connected to the first curved face portion, and when viewed in a longitudinal section of the barrel part containing the predetermined axis ($X1$), the first curved face portion has an arc shape that has a smaller radius of curvature than that of the second curved face portion.

The larger the radius of curvature of the concavely curved face of the cavity-forming face portion on the outer peripheral face of the barrel part, the wider the range over which stress generated in the cavity-forming face portion by a thrust load is dispersed, and this is effective for alleviating the concentration of stress. However, in relation to the first flat face portion extending radially inward from the inner end of the weld part, the larger the radius of curvature of the concavely curved face connected to the first flat face portion, the deeper the radially inward recess of the cavity-forming face portion and the smaller the thickness of the barrel part. On the other hand, in accordance with the seventh aspect of the present invention, since the second curved face portion having a large radius of curvature is connected to the first flat face portion via the first curved face portion having a small radius of curvature, the recess of the cavity-forming face portion on the outer peripheral face of the barrel part can be made as shallow as possible by specially providing the first curved face portion having a small radius of curvature while alleviating the concentration of stress by dispersing the stress caused in the cavity-forming face portion due to a thrust load over a wide range by means of the second curved face portion having a large radius of curvature, thus enabling any decrease in the thickness caused by specially providing the cavity-forming face portion to be minimized, and it becomes possible to ensure sufficient stiffness for the barrel part.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention are explained below by reference to the attached drawings.

Figure 1:
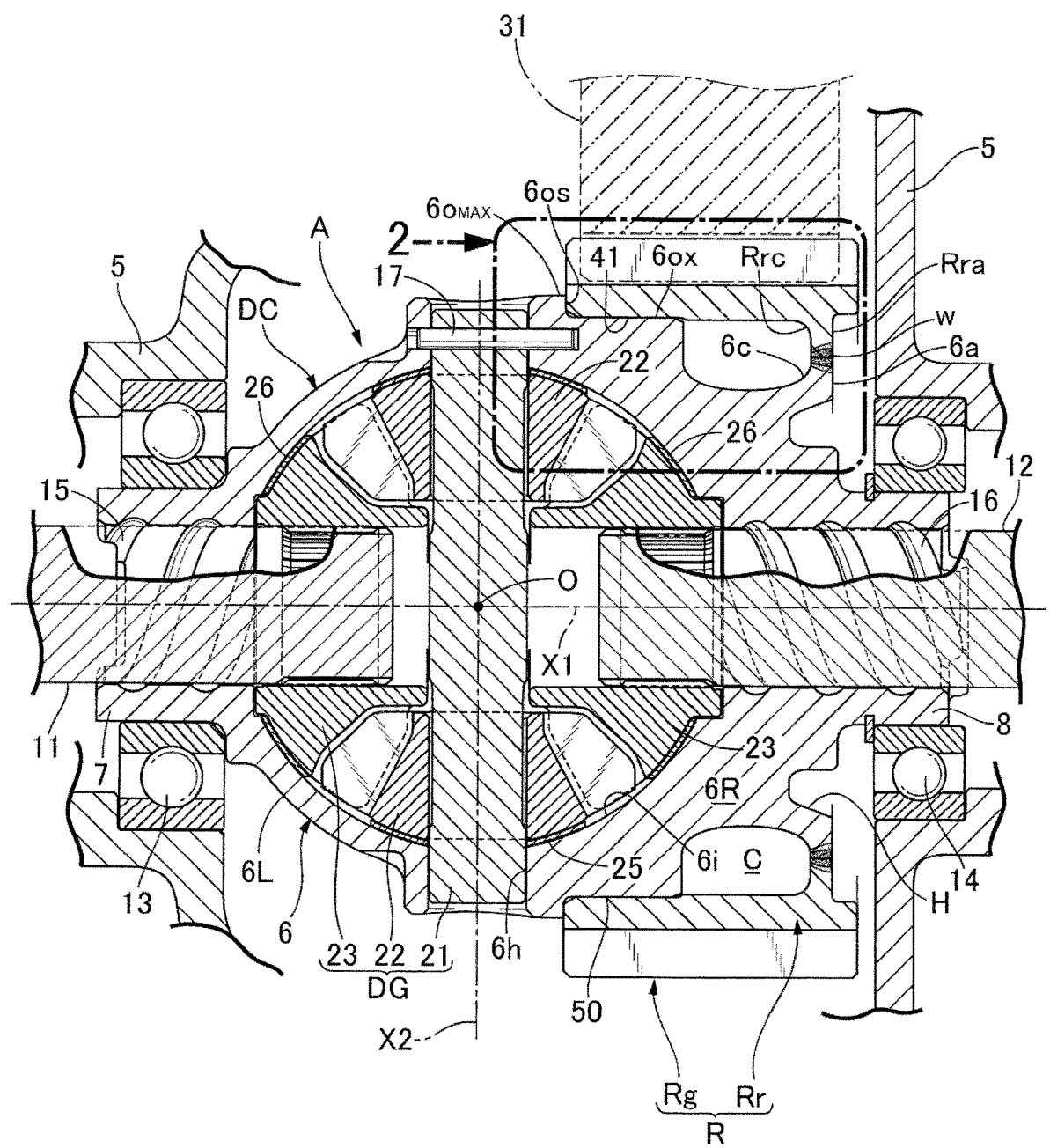
FIG. 1 is a longitudinal sectional view showing a differential device and peripheral equipment related to a first embodiment of the present invention.
Figure 2:
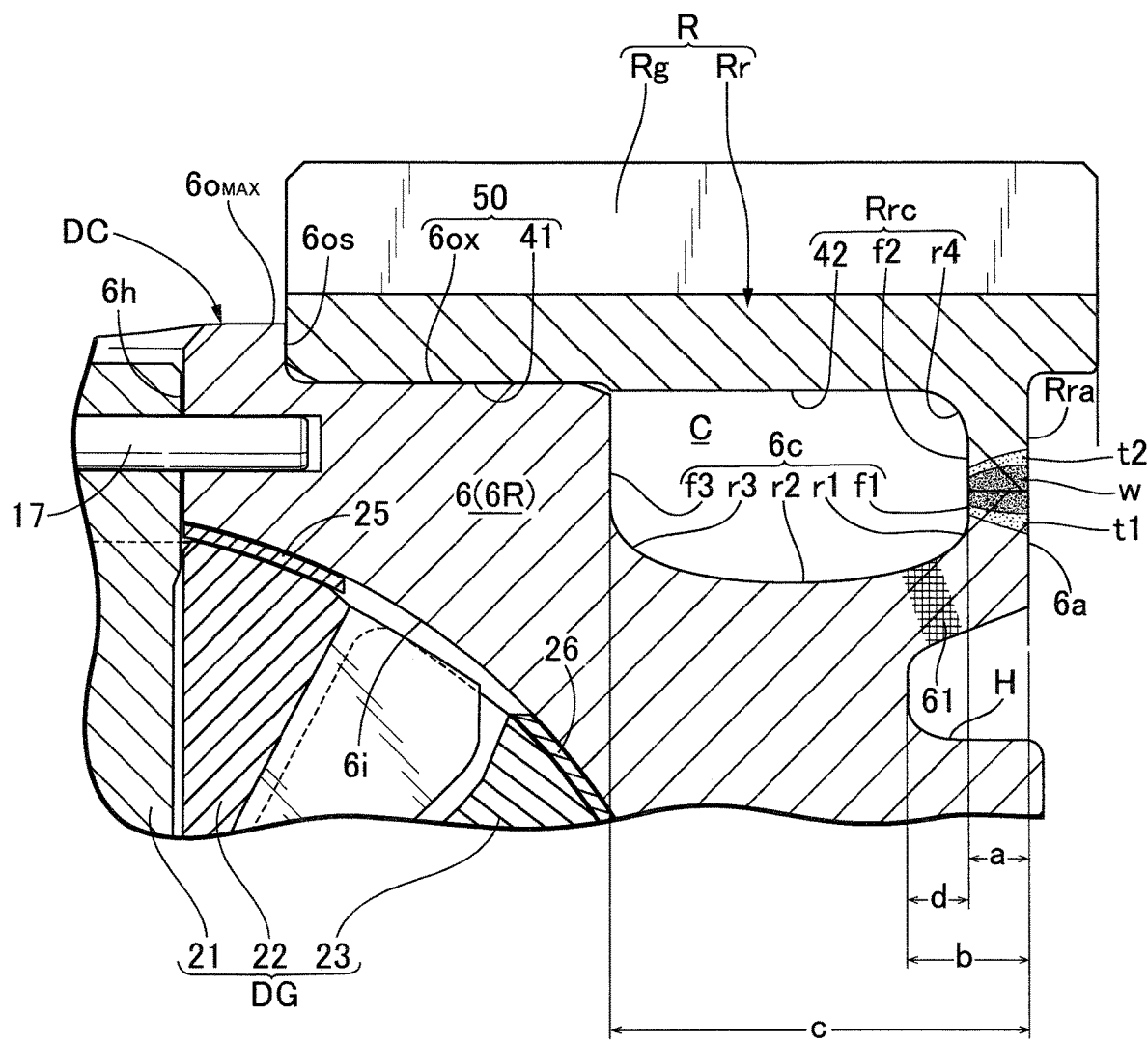
FIG. 2 is an enlarged sectional view of a part shown by arrow 2 in FIG. 1.

First, referring to FIG. 1 and FIG. 2, a first embodiment is explained. In FIG. 1, a differential device A is housed in a transmission case 5 mounted on a vehicle such as for example an automobile, the differential device A transmitting power from a power source (for example, a vehicle-mounted engine), which is not illustrated, while distributing it between left and right axles 11, 12. The differential device A includes a differential case DC that is made of a metal and can rotate around a first axis X1 as a predetermined axis, and a differential mechanism DG that is installed within the differential case DC. The left and right axles 11, 12 are one example of a pair of drive shafts.

Provided within the transmission case 5 is a drive gear 31 that is operatively coupled to the power source via a gear shift device, which is not illustrated. A ring gear R meshing with the drive gear 31 is fixed to and supported on the differential case DC via a mounting structure, which is described later.

The differential case DC includes a hollow barrel part 6 that is formed into a substantially spherical shape and houses the differential mechanism DG in the interior, and first and second bearing bosses 7, 8 that are connectedly provided integrally with one and the other of left and right sides of the barrel part 6 and are arranged on the first axis X1. The first and second bearing bosses 7, 8 are supported on the transmission case 5 via bearings 13, 14 so that they can rotate around the first axis X1. The transmission case 5 is dividedly formed from a plurality of case elements that are detachable from each other, and is appropriately disassembled when mounting the differential case DC or when carrying out inspection and maintenance.

The left and right axles 11, 12 are rotatably fitted into inner peripheral faces of the first and second bearing bosses 7, 8, and helical grooves 15, 16 for drawing in lubricating oil (see FIG. 1) are provided on the inner peripheral faces. The helical grooves 15, 16 exhibit a screw pump action that sends lubricating oil within the transmission case 5 into the differential case DC accompanying relative rotation between the bearing bosses 7, 8 and the axles 11, 12.

The differential mechanism DG includes a pinion shaft 21 that is disposed on a second axis X2 that is orthogonal to the first axis X1 at a center O of the barrel part 6 and is supported on the barrel part 6, a pair of pinion gears 22 that are rotatably supported on the pinion shaft 21, and left and right side gears 23 that mesh with the respective pinion gears 22 and can rotate around the first axis X1. The side gears 23 function as output gears of the differential mechanism DG, and inner end parts of the left and right axles 11, 12 are spline fitted into inner peripheral faces of the two side gears 23 respectively.

Back faces of the pinion gear 22 and the side gear 23 are rotatably supported on an inner face 6$i$ of the barrel part 6 via washers 25, 26 respectively. The inner face 6$i$ of the barrel part 6, for example, a pinion gear support face that opposes the back face of the pinion gear 22 via the washer 25 and a side gear support face that opposes the back face of the side gear 23 via the washer 26, is machined into a spherical shape by means of a machining tool (for example, a cutting tool of a lathe). Here, the washers 25, 26 may be omitted, and the back faces of the pinion gear 22 and the side gear 23 may be rotatably supported directly on the inner face 6$i$ of the barrel part 6.

The pinion shaft 21 is inserted through and retained by a pair of support holes 6$h$ that are provided in the barrel part 6 and extend on the second axis X2. The two support holes 6$h$ are disposed on a maximum diameter outer peripheral portion 6$o_{MAX}$ of the barrel part 6 or a thick outer peripheral part in an area therearound. A retaining pin 17 is attached by insertion (for example, press fitting) to the thick outer peripheral part of the barrel part 6, the retaining pin 17 extending so as to transect one end part of the pinion shaft 21 and preventing the pinion shaft 21 from disengaging from the support hole 6$h$.

With regard to the barrel part 6, compared with a first barrel part half body 6L that is positioned further on one side (the left side in FIG. 1) than the pinion shaft 21 in the axial direction, a second barrel part half body 6R that is positioned on the other side (the right side in FIG. 1) is formed so as to be thicker overall. The inner peripheral side of the ring gear R is stably and fixedly supported on the thick second barrel part half body 6R. A rotational driving force that has been transmitted from the drive gear 31 to the barrel part 6 of the differential case DC via the ring gear R is distributed between the left and right axles 11, 12 by means of the differential mechanism DG while allowing differential rotation. The differential function of the differential mechanism DG is conventionally known and will not be explained here.

Although not illustrated, the barrel part 6 of the differential case DC has a pair of access windows mainly in the first barrel part half body 6L, the two access windows being symmetrically disposed and formed on opposite sides of the second axis X2 when viewed on a projection plane orthogonal to the first axis X1. The two access windows are for allowing the inner face 6$i$ of the barrel part 6 to be machined by turning or the differential mechanism DG to be assembled to the interior of the barrel part 6, and are formed so as to have a sufficiently large shape commensurate with the purpose. Referring in addition to FIG. 2, the structure via which the ring gear R is mounted on the barrel part 6 (more specifically, the second barrel part half body 6R) is next explained.

The ring gear R includes a gear portion Rg that meshes with the drive gear 31 and a rim portion Rr that is formed integrally with the inner periphery of the gear portion Rg. The gear portion Rg has a helical gear-shaped tooth part and receives a thrust load in the axial direction (that is, the thrust direction component of a meshing reaction force) accompanying it meshing with the drive gear 31, which similarly has a helical gear-shaped tooth part. This thrust load from the ring gear R is received by the barrel part 6 via a weld part w, which is described later. In FIG. 1, in order to simplify the illustration, the gear portion Rg is shown as a section along the line of the tooth.

The rim portion Rr is formed into a basically cylindrical shape, and a first inner peripheral face portion 41, on one end side in the axial direction (that is, the side close to the pinion shaft 21), of the inner peripheral face 40 is fitted onto and supported on a predetermined outer peripheral portion 6ox of the barrel part 6 in a non-welded state. The predetermined outer peripheral portion 6ox is formed into a cylindrical face shape that has a slightly smaller diameter than that of the maximum diameter outer peripheral portion $6o_{MAX}$, and is adjacent to the maximum diameter outer peripheral portion $6o_{MAX}$ across a small step 6os. Abutting an inner end face of the rim portion R against the step 6os reliably determines the axial position of the ring gear R fitted around the outer periphery of the barrel part 6.

Although not illustrated, as a modified example of the first embodiment, a structure in which the inner end face of the rim portion R does not abut against the step 6os (that is, it is spaced a little from the step 6os in the axial direction) is also feasible.

In the present embodiment, the start of the step 6os is chamfered into a rounded shape in order to ensure strength, and an axially inner end part of the first inner peripheral face portion 41 of the rim portion Rr is chamfered so as to escape the start of the step 6os.

Since, with regard to the ring gear R described above, the inner periphery of the rim portion Rr is fitted onto and supported on the outer periphery of the barrel part 6 of the differential case DC, in particular the predetermined outer peripheral portion 6ox, which is close to the maximum diameter outer peripheral portion $6o_{MAX}$, it is unnecessary to projectingly provide a radially inward facing flange on the inner periphery of the rim portion Rr in order to fit and support the ring gear R, and it is unnecessary to projectingly provide a radially outward facing flange on the outer periphery of the barrel part 6. It is therefore advantageous in reducing the diameter of the ring gear R.

In the present embodiment, a fitting part 50 via which the rim portion Rr (that is, the first inner peripheral face portion 41) and the barrel part 6 (that is, the predetermined outer peripheral portion 6ox) are fitted to each other is set to be in a fitted state in which the rim portion Rr (that is, the first inner peripheral face portion 41) and the barrel part 6 (that is, the predetermined outer peripheral portion 6ox) can slide relative to each other in the axial direction but are free of play in the radial direction. When in such a fitted state in which relative sliding is possible, even if the fitting part 50 has only a small sliding gap, venting of gas when welding is possible through the fitting part 50.

With regard to the fitting part 50, a predetermined interference allowance may be set between the mating faces so that the fitting part 50 attains a press fitted state (for example, lightly press fitted or strongly press fitted). In this case, the thrust load can also be received through the fitting part 50 in the press fitted state, a certain degree of torque can also be transmitted, and the burden on a weld part w, which is described later, is lightened accordingly.

Thus, 'fitted' in the present invention is a concept that not only includes a fitted state in which relative sliding in the axial direction is possible but also includes a case in which the fitting part 50 is in the press fitted state (for example, lightly press fitted or strongly press fitted) described above.

An annular collar-shaped to-be-fixed portion Rra that extends radially inward and faces inward is projectingly provided integrally with an inner peripheral face of the rim portion Rr of the ring gear R at a position spaced outward in the axial direction (that is, toward the side going away from the pinion shaft 21) from the fitting part 50 between the rim portion Rr and the barrel part 6. On the other hand, an annular collar-shaped supporting projection portion 6a that faces radially outward is projectingly provided integrally with an outer peripheral face of the barrel part 6 (second barrel part half body 6R) at a position spaced outward in the axial direction from the fitting part 50.

A radially outer end part of the supporting projection portion 6a and a radially inner end part of the to-be-fixed portion Rra are welded in a state in which they are present at a position that is further axially outside and radially inside than the fitting part 50 and they are abutted against each other through the entire periphery. As means for welding them, a conventionally known welding method (for example, laser welding, electron beam welding, etc.) may be employed as appropriate.

An annular recess part H is formed in an axially outer end face of the barrel part 6 (more specifically, the second barrel part half body 6R), in particular in an end face portion connected to the supporting projection portion 6a, the recess part H being positioned further radially inside than the weld part w between the to-be-fixed portion Rra and the supporting projection portion 6a and being recessed toward the inner side of the barrel part 6 in the axial direction.

The weld part w and the fitting part 50 are spaced from each other in the axial direction, and an annular cavity part C is formed between the weld part w and the fitting part 50, the cavity part C being sandwiched between the barrel part 6 and the rim portion Rr in the radial direction.

The cavity part C and the recess part H are formed so that at least parts thereof in the axial range overlap each other. That is, when the axial width of the weld part w is defined as a and the axial depth of the recess part H from the axial outer end of the weld part w is defined as b, the axial width a and the axial depth b are set so that b>a holds. Therefore, the axial depth b of the recess part H is larger than the axial range a of the weld part w.

When an amount of overlap in the axial range between the cavity part C and the recess part H is defined as d, d=b−a holds. Therefore, the deeper the axial depth b of the recess part H compared with the axial width a of the weld part w, the larger the amount of overlap d between the cavity part C and the recess part H.

Furthermore, when the axial distance from the outer end of the weld part w to the axially inner end of the cavity part C is defined as c, the axial distance c and the axial depth b of the recess part H are set so that c>b holds. It is thus clear that the inner end part of the cavity part C is present at a position that is further back (that is, further axially inside) than the inner end part of the recess part H. In this case, since c>b holds, it is possible to ensure a sufficient spatial volume for the cavity part C, and when gas within the cavity part C expands when welding, with regard to the inner pressure of the cavity part C, due to the spatial volume being large, the thermal capacity of gas within the cavity part C is large, and the gas is less likely to expand in response to the input of heat due to welding. Furthermore, if the internal pressure of the cavity part C while it is heated by welding and then naturally cooled does not attain a pressure that causes a welding fault, it is also unnecessary to employ a structure for venting of gas. Even if venting of gas is necessary, since gas is less likely to expand due to the cavity part C having a large spatial volume, the amount of gas to be discharged can be reduced, and the sectional area of a hole, etc. necessary for venting of gas can be small.

In the present embodiment, the axial fitting length of the fitting part 50 between the rim portion Rr and the barrel part 6 is set to be sufficiently larger than the axial length of the weld part w. This enables the rim portion Rr to be more stably fitted onto and supported on the barrel part 6.

A cavity-forming face portion 6c, facing the cavity part C, of the outer peripheral face of the barrel part 6 is formed as a continuous face that is smoothly continuous from the axially inner end of the weld part w to the fitting part 50. More specifically, as clearly shown in FIG. 2, the cavity-forming face portion 6c has a first flat face portion f1 extending linearly and radially inward from the axially inner end of the weld part w, a first curved face portion r1 having a recessed shape connected to the first flat face portion f1, a second curved face portion r2 having a recessed shape connected to the first curved face portion r1, a third curved face portion r3 having a recessed shape connected to the second curved face portion r2, and a third flat face portion f3 that extends linearly and radially outward from the third curved face portion r3 to the vicinity of the outer end of the fitting part 50 (that is, the predetermined outer peripheral portion 6ox).

When viewed in a longitudinal section of the barrel part 6 containing the first axis X1 (for example, FIG. 2), the first flat face portion f1 is substantially orthogonal to the predetermined axis X1, and the first and third curved face portions r1, r3 are formed into an arc shape that has a smaller radius of curvature than that of the second curved face portion r2. It is desirable that the second curved face portion r2 has as large a radius of curvature as possible.

On the other hand, a cavity-forming face portion Rrc, facing the cavity part C, of the inner peripheral face of the rim portion Rr has a second flat face portion f2 that extends linearly and radially outward from the axially inner end of the weld part w and is substantially orthogonal to the predetermined axis X1, a fourth curved face portion r4 that is connected to the second flat face portion f2, and a second inner peripheral face portion 42 that has a cylindrical face shape, is connected to the fourth curved face portion r4, and extends in the axial direction to the fitting part 50 (that is, the first inner peripheral face portion 41). There is a slight difference in the internal diameter between the first and second inner peripheral face portions 41, 42 of the rim portion Rr, with a small step face having a rounded shape therebetween.

The supporting projection portion 6a of the barrel part 6 and the to-be-fixed portion Rra of the rim portion Rr have, in the area around the weld part w therebetween, heat-affected parts t1, t2 respectively that are hardened by the input of heat when welding. As clearly shown in FIG. 2, the first and second flat face portions f1, f2 are formed so as to have a sufficient radial range so that they can include all of the region, facing the cavity part C, of the heat-affected parts t1, t2.

The operation of the first embodiment is now explained.

The entirety of the differential case DC is molded (for example, cast) as a unit from an appropriate metal material (for example, an iron-based alloy, an aluminum alloy, etc.), and after being molded each part of the differential case DC is subjected to machining as appropriate. Said machining includes for example at least surface finishing of the predetermined outer peripheral portion 6ox or the step 6os of the barrel part 6, grooving of the helical grooves 15, 16, and cutting of the inner face 6i of the barrel part 6.

When assembling the differential device A, first, each constituent element of the differential mechanism DG is inserted through the access window, which is not illustrated, or the support hole 6h into the barrel part 6 of the differential case DC and set at a predetermined assembly position.

Subsequently, the ring gear R is fixed to the outer periphery of the barrel part 6 of the differential case DC by the following procedure.

First, the first inner peripheral face portion 41 of the rim portion Rr of the ring gear R is fitted onto the predetermined outer peripheral portion 6ox of the barrel part 6 of the differential case DC so that the axially inner end face of the rim portion Rr engages with the step 6os of the outer periphery of the barrel part 6. In a state in which fitting is complete, the radially outer end part of the supporting projection portion 6a on the outer periphery of the barrel part 6 and the radially inner end part of the to-be-fixed portion Rra on the inner periphery of the rim portion Rr are abutted against each other in the radial direction.

Subsequently, in this abutted state, the radially outer end part of the supporting projection portion 6a and the radially inner end part of the to-be-fixed portion Rra are welded to each other along the entire periphery from the axially outer side of the differential case DC (the right side in FIGS. 1, 2), thus integrally joining the inner periphery of the rim portion Rr and the outer periphery of the barrel part 6 via the weld part w. In this case, the step 6os on the outer periphery of the barrel part 6 not only functions as positioning means that easily determines the position via which the ring gear R is fitted onto the outer periphery of the barrel part 6 but can also exhibit a function of receiving a thrust load in one direction (the left direction in FIGS. 1, 2) that the ring gear R receives from the drive gear 31, and it is therefore advantageous in terms of enhancing the ease of assembly of the ring gear R and alleviating the burden on the weld part w.

The work of assembling the differential mechanism DG to the interior of the barrel part 6 and the work of fixing the ring gear R to the barrel part 6 may be carried out in the reverse order to the above. That is, after the ring gear R is fitted onto and welded to the outer periphery of the barrel part 6, the differential mechanism DG may be assembled to the interior of the barrel part 6.

After assembly of the differential mechanism DG and welding of the ring gear R to the differential case DC are completed, the first and second bearing bosses 7, 8 of the differential case DC are rotatably supported on the transmission case 5 via the bearings 13, 14, and the inner end parts of the left and right axles 11, 12 are then inserted into the first and second bearing bosses 7, 8 and spline fitted into the inner peripheries of the left and right side gears 23, thus completing assembly of the differential device A to the interior of the transmission case 5.

In the differential device A of the present embodiment explained above, the ring gear R includes the gear portion Rg and the rim portion Rr, which is formed integrally with the inner periphery of the gear portion Rg and fitted onto the predetermined outer peripheral portion 6ox in the vicinity of the maximum diameter outer peripheral portion $6o_{MAX}$ of the barrel part 6 of the differential case DC in a non-welded state, and the rim portion Rr has the to-be-fixed portion Rra, which is welded to the barrel part 6 at a position spaced in the axial direction from the fitting part 50 between the rim portion Rr and the barrel part 6 and further radially inside than the fitting part 50.

In accordance with such a fixing structure for the ring gear R, even if in order to reduce the diameter of the ring gear R the inner periphery of the rim portion Rr is fitted directly around the outer periphery of the barrel part 6, since the gear portion Rg can be spaced sufficiently in the radial direction from the weld part w between the ring gear R and the barrel part 6, it becomes possible to suppress the influence of thermal distortion due to welding on the gear portion Rg. Therefore, while suppressing any degradation in terms of strength and durability of the gear portion Rg caused by thermal distortion, it becomes possible to achieve a small diameter for the differential case DC equipped with the ring gear R. Moreover, since the welded area between the barrel part 6 and the ring gear R is decreased by directly fitting the inner periphery of the rim portion Rr onto the outer periphery of the barrel part 6 in a non-welded state, cost can be saved accordingly, and the productivity can be improved.

The recess part H is formed in the end face, on the axially outer side, of the barrel part 6 of the present embodiment, the recess part H being positioned further radially inward than the weld part w between the inner periphery of the rim portion Rr and the outer periphery of the barrel part 6 and recessed to the inner side of the barrel part 6 in the axial direction. In accordance with the recess part H being specially provided, since the area around the recess part H on the outer periphery of the barrel part 6 (in particular an area sandwiched between the recess part H and the weld part w in the radial direction) easily undergoes elastic deformation, thermal distortion due to shrinkage after welding can easily be absorbed, and it is thus possible to further suppress the influence of thermal distortion on the gear portion Rg.

In this case since, in the present embodiment in particular, when the axial width of the weld part w is defined as a and the axial depth of the recess part H from the axially outer end of the weld part w is defined as b, they are set so that b>a holds, it is possible to set the recess part H sufficiently deeply with respect to the axial width of the weld part w, it becomes possible to ensure a sufficiently large elastically deformable area, and the influence of thermal distortion on the gear portion Rg can be lessened.

The ring gear R of the present embodiment has a tooth shape (that is, a helical tooth) that receives a thrust load due to it meshing with the drive gear 31, the weld part w between the rim portion Rr and the barrel part 6 is spaced in the axial direction from the fitting part 50, and the annular cavity part C is formed between the weld part w and the fitting part 50, the cavity part C being sandwiched between the barrel part 6 and the rim portion Rr in the radial direction.

Since the cavity-forming face portion 6c on the outer peripheral face of the barrel part 6 is formed from a continuous face that is smoothly continuous from the axially inner end of the weld part w to the fitting part 50 (that is, f1, r1 to r3, f3), it is possible to alleviate effectively a concentration of stress in the vicinity of the cavity-forming face portion 6c caused by a thrust load.

Furthermore, in the present embodiment, the cavity part C and the recess part H are formed so that at least parts of the axial ranges thereof overlap one another (see region d in FIG. 2). In accordance with this overlapping arrangement, since a thin part 61 (see for example a lattice-shaped hatched region in FIG. 2) that is sandwiched between the cavity-forming face portion 6c on the outer peripheral face of the barrel part 6 and the inner face of the recess part H and has the smallest thickness easily undergoes elastic deformation as a result of thermal distortion due to shrinkage after welding, the thermal distortion due to shrinkage after welding can be absorbed, and the influence of thermal distortion on the gear portion Rg can be lessened. Furthermore, it is possible, by appropriately setting the relative positional relationship between the cavity-forming face portion 6c and the recess part H, to easily adjust the stiffness, the position, the region, etc. of the thin part 61.

Moreover, in the present embodiment, the cavity-forming face portion 6c on the outer peripheral face of the barrel part 6 has the first flat face portion f1, which extends radially inward from the axially inner end of the weld part w and is substantially orthogonal to the first axis X1, and the cavity-forming face portion Rrc on the inner peripheral face of the rim portion Rr has the second flat face portion f2, which extends radially outward from the axially inner end of the weld part w and is substantially orthogonal to the first axis X1. The barrel part 6 and the rim portion Rr have, in the area around the weld part w therebetween, the heat-affected parts t1, t2 respectively, which are hardened by the input of heat when welding, and the first and second flat face portions f1, f2 are formed so as to include all the region, facing the cavity part C, of the heat-affected parts t1, t2. Since the heat-affected parts t1, t2 are thus not provided with an inflection point or a step that would cause a concentration of stress, it is possible to prevent effectively any damage starting at the heat-affected parts t1, t2.

The larger the radius of curvature of the concavely curved face of the cavity-forming face portion 6c on the outer periphery of the barrel part 6, the wider the range over which stress generated in the cavity-forming face portion 6c by a thrust load is dispersed, and this is effective for alleviating the concentration of stress. However, in relation to the first flat face portion f1 extending radially inward from the inner end of the weld part w, the larger the radius of curvature of the concavely curved face connected to the first flat face portion f1, the deeper the radially inward recess of the cavity-forming face portion 6c and the smaller the thickness of the barrel part 6, which is a problem. As a countermeasure thereagainst, in the present embodiment, since the second curved face portion r2 having a large radius of curvature is connected to the first flat face portion f1 via the first curved face portion r1 having a small radius of curvature, the recess of the cavity-forming face portion 6c can be made as shallow as possible by specially providing the first curved face portion r1 having a small radius of curvature while alleviating the concentration of stress by dispersing the stress caused in the cavity-forming face portion 6c due to a thrust load over a wide range by means of the second curved face portion r2 having a large radius of curvature, thus minimizing any decrease in the thickness caused by specially providing the cavity-forming face portion 6c.

Moreover, since the cavity-forming face portion 6c on the outer periphery of the barrel part 6 is not excessively deeply recessed radially inward, it is possible to ensure a necessary thickness for the thin part 61 between the cavity-forming face portion 6c and the recess part H, and the thin part 61 can easily undergo elastic deformation without its strength being excessively decreased. A sufficient thickness can be ensured for the barrel part 6 despite the cavity part C being specially provided, and a sufficient stiffness can be ensured.

Furthermore, in the present embodiment, since the cavity-forming face portion 6c on the outer peripheral face of the barrel part 6 has the third flat face portion f3, which extends linearly and radially inward from the vicinity of the outer end of the fitting part 50 (the predetermined outer peripheral portion 6ox), it is possible to displace the starting position, on the fitting part 50 side, of the cavity-forming face portion 6c toward the axially outer side (that is, the side going away from the pinion shaft 21, in other words the side far away from the inner end of the fitting part 50). Since it is possible to ensure a long axial range for the fitting part 50 by a portion corresponding to the displacement, the ring gear R is more stably fitted onto and supported by the outer periphery of the barrel part 6.

The cavity-forming face portion 6c of the present embodiment has the third curved face portion r3 having a recessed shape connected to the third flat face portion f3, and the third curved face portion r3 has an arc shape having a smaller radius of curvature than that of the second curved face portion r2 and is smoothly continuous from the second curved face portion r2. If the third curved face portion r3 were omitted, stress would be concentrated on a corner part that would have been formed in a part via which the second curved face portion r2 and the third flat face portion f3 are connected, and it would be necessary to make a smoothly continuous face, but if the continuous face were such that the third flat face portion f3 was smoothly continuous from the tangent of the second curved face portion r2 having a large radius of curvature, since the second curved face portion r2 has a large radius of curvature, the dimensions of the differential case (barrel part 6) would increase. By connecting the third flat face portion f3 and the second curved face portion r2 via the third curved face portion r3, which has a smaller radius of curvature than that of the second curved face portion r2, it becomes possible to alleviate the concentration of stress on the cavity-forming face portion 6c while avoiding any increase in the dimensions.

Figure 3:
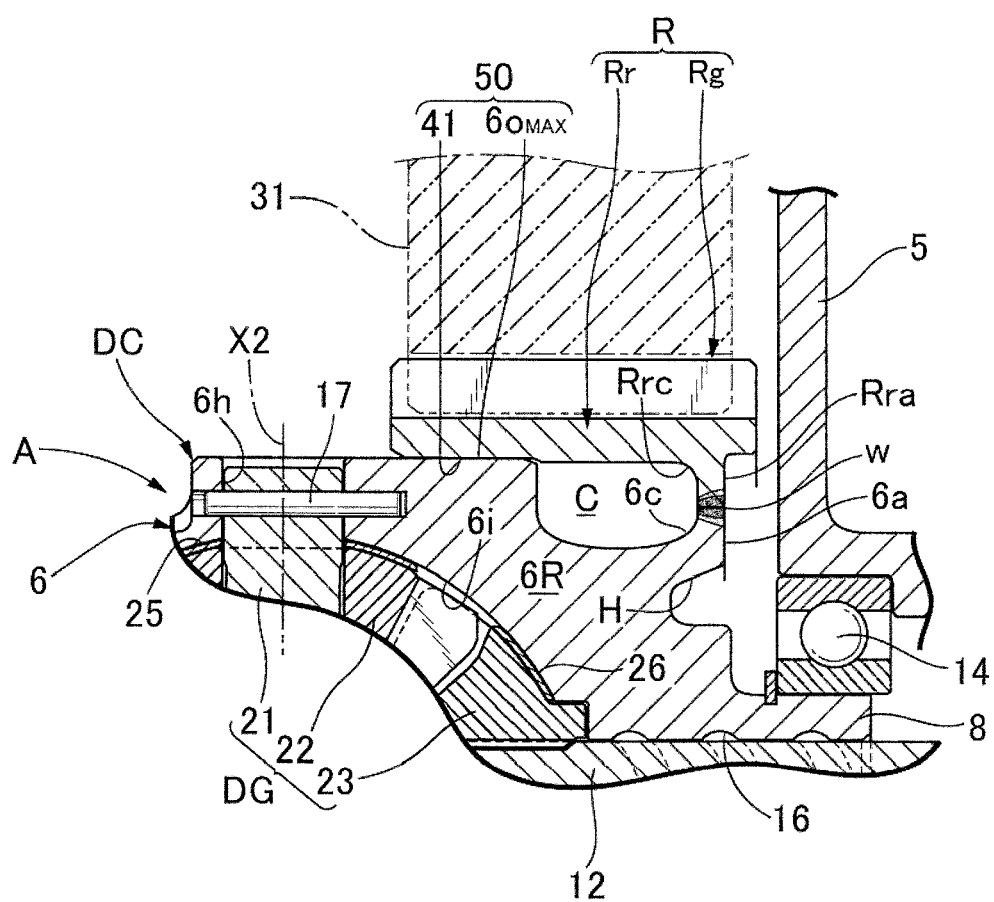
FIG. 3 is a longitudinal sectional view of an essential part showing a differential device and peripheral equipment related to a second embodiment of the present invention.

FIG. 3 shows a second embodiment of the present invention. In the differential case DC of the first embodiment, the inner periphery of the rim portion Rr of the ring gear R is fitted onto the predetermined outer peripheral portion $6o_x$ of the barrel part 6, which is adjacent to the maximum diameter outer peripheral portion $6o_{MAX}$ via the step $6os$, and the end face of the rim portion Rr is engaged with the step $6os$. However, the step $6os$ is not always necessary, and for example in the second embodiment the first inner peripheral face portion 41 on the inner periphery of the rim portion Rr of the ring gear R is fitted onto a cylindrical face of the maximum diameter outer peripheral portion $6o_{MAX}$ of the barrel part 6. The arrangement of the second embodiment is otherwise the same as that of the first embodiment, and constituent elements of the second embodiment are denoted by the reference numerals and symbols of the corresponding constituent elements of the first embodiment, explanation of the structure being omitted.

In the second embodiment, basically the same effects as those of the first embodiment (excluding the effect based on the end face of the rim portion Rr engaging with the step $6os$) can be achieved. Furthermore, in the second embodiment, it is not necessary to specially provide a step for positioning the ring gear R in the area around the maximum diameter outer peripheral portion $6o_{MAX}$ of the barrel part 6, the outer peripheral shape of the barrel part 6 can accordingly be simplified, and there are advantages such as good ease of machining.

Embodiments of the present invention are explained above, but the present invention is not limited to the above-mentioned embodiments and may be modified in a variety of ways as long as the modifications do not depart from the gist of the present invention.

For example, the embodiments show a case in which the differential device A is used as a differential device for a vehicle, in particular a differential device between left and right driven wheels, but in the present invention the differential device A may be used as a differential device between front and rear driven wheels of a vehicle. Alternatively, the differential device of the present invention may be used as a differential device in various types of machines and devices other than a vehicle.

Furthermore, in the embodiments, a tooth part of the ring gear R is shown as a helical gear shape, but the ring gear of the present invention may not be a helical gear or may be another gear having a tooth shape that receives a thrust load in a direction along the first axis X1 due to it meshing with the drive gear 31 (for example, a bevel gear, a hypoid gear, etc.). Alternatively, it may be a gear having a tooth shape that does not receive a thrust load due to it meshing with the drive gear 31 (for example, a spur gear).

What is claimed is:

1. A differential device comprising
a ring gear that receives a rotational driving force from a drive gear connected to a power source,
a differential case that rotates integrally with the ring gear around a predetermined axis, and
a differential mechanism that is installed within a barrel part of the differential case, the differential mechanism being capable of distributing between a pair of drive shafts the rotational driving force that has been transmitted from the drive gear to the differential case via the ring gear while allowing differential rotation,
wherein the ring gear comprises a gear portion that meshes with the drive gear, and a rim portion that is formed integrally with an inner periphery of the gear portion and is fitted onto a maximum diameter outer peripheral portion of the barrel part or a predetermined outer peripheral portion having a smaller diameter than the maximum diameter outer peripheral portion, and
the rim portion has a fixed portion that is welded to the barrel part thereby to form a weld part at a position that is spaced in an axial direction from a fitting part via which the rim portion and the barrel part are fitted, the position being further radially inward than the fitting part.

2. The differential device according to claim 1, wherein the barrel part has a recess part that is positioned further radially inward than the weld part and is recessed inward in an axial direction of the barrel part.

3. The differential device according to claim 2, wherein an axial width (a) of the weld part and an axial depth (b) of the recess part from an outer end in the axial direction of the weld part are set so that the axial depth (b)>the axial width (a) holds.

4. The differential device according to claim 1, wherein
the ring gear has a tooth shape such that the ring gear receives a thrust load in the axial direction due to the gear portion and the drive gear meshing with each other,
the weld part is spaced from the fitting part in the axial direction,
a cavity part is formed between the weld part and the fitting part so as to be sandwiched by the barrel part and the rim portion, and
a cavity-forming face portion, facing the cavity part, of an outer peripheral face of the barrel part is formed as a continuous face that continues smoothly from an inner end in the axial direction of the weld part to the fitting part.

5. The differential device according to claim 2, wherein
the weld part is spaced in the axial direction from the fitting part,
a cavity part is formed between the weld part and the fitting part so as to be sandwiched by the barrel part and the rim portion, and
the cavity part and the recess part are formed so that at least parts thereof in an axial range overlap each other.

6. The differential device according to claim 3, wherein
the weld part is spaced in the axial direction from the fitting part, a cavity part is formed between the weld part and the fitting part so as to be sandwiched by the barrel part and the rim portion, and the cavity part and the recess part are formed so that at least parts thereof in an axial range overlap each other.

7. The differential device according to claim 1, wherein the weld part is spaced from the fitting part in the axial direction, a cavity part is formed between the weld part and the fitting part so as to be sandwiched by the barrel part and the rim portion, a cavity-forming face portion, facing the cavity part, of an outer peripheral face of the barrel part has a first flat face portion that extends radially inward from the inner end in the axial direction of the weld part and is substantially orthogonal to the predetermined axis, a cavity-forming face portion, facing the cavity part, of an inner peripheral face of the rim portion has a second flat face portion that extends radially outward from the inner end in the axial direction of the weld part and is substantially orthogonal to the predetermined axis, the barrel part and the rim portion each have, in an area around the weld part, a heat-affected portion that is hardened by an input of heat when welding, and the first and second flat face portions are formed so as to include all of a region, facing the cavity part, of the heat-affected portion.

8. The differential device according to claim 2, wherein the weld part is spaced from the fitting part in the axial direction, a cavity part is formed between the weld part and the fitting part so as to be sandwiched by the barrel part and the rim portion, a cavity-forming face portion, facing the cavity part, of an outer peripheral face of the barrel part has a first flat face portion that extends radially inward from the inner end in the axial direction of the weld part and is substantially orthogonal to the predetermined axis, a cavity-forming face portion, facing the cavity part, of an inner peripheral face of the rim portion has a second flat face portion that extends radially outward from the inner end in the axial direction of the weld part and is substantially orthogonal to the predetermined axis, the barrel part and the rim portion each have, in an area around the weld part, a heat-affected portion that is hardened by an input of heat when welding, and the first and second flat face portions are formed so as to include all of a region, facing the cavity part, of the heat-affected portion.

9. The differential device according to claim 3, wherein the weld part is spaced from the fitting part in the axial direction, a cavity part is formed between the weld part and the fitting part so as to be sandwiched by the barrel part and the rim portion, a cavity-forming face portion, facing the cavity part, of an outer peripheral face of the barrel part has a first flat face portion that extends radially inward from the inner end in the axial direction of the weld part and is substantially orthogonal to the predetermined axis, a cavity-forming face portion, facing the cavity part, of an inner peripheral face of the rim portion has a second flat face portion that extends radially outward from the inner end in the axial direction of the weld part and is substantially orthogonal to the predetermined axis, the barrel part and the rim portion each have, in an area around the weld part, a heat-affected portion that is hardened by an input of heat when welding, and the first and second flat face portions are formed so as to include all of a region, facing the cavity part, of the heat-affected portion.

10. The differential device according to claim 4, wherein the weld part is spaced from the fitting part in the axial direction, the cavity part is formed between the weld part and the fitting part so as to be sandwiched by the barrel part and the rim portion, the cavity-forming face portion, facing the cavity part, of an outer peripheral face of the barrel part has a first flat face portion that extends radially inward from the inner end in the axial direction of the weld part and is substantially orthogonal to the predetermined axis, a cavity-forming face portion, facing the cavity part, of an inner peripheral face of the rim portion has a second flat face portion that extends radially outward from the inner end in the axial direction of the weld part and is substantially orthogonal to the predetermined axis, the barrel part and the rim portion each have, in an area around the weld part, a heat-affected portion that is hardened by an input of heat when welding, and the first and second flat face portions are formed so as to include all of a region, facing the cavity part, of the heat-affected portion.

11. The differential device according to claim 5, wherein the weld part is spaced from the fitting part in the axial direction, the cavity part is formed between the weld part and the fitting part so as to be sandwiched by the barrel part and the rim portion, a cavity-forming face portion, facing the cavity part, of an outer peripheral face of the barrel part has a first flat face portion that extends radially inward from the inner end in the axial direction of the weld part and is substantially orthogonal to the predetermined axis, a cavity-forming face portion, facing the cavity part, of an inner peripheral face of the rim portion has a second flat face portion that extends radially outward from the inner end in the axial direction of the weld part and is substantially orthogonal to the predetermined axis, the barrel part and the rim portion each have, in an area around the weld part, a heat-affected portion that is hardened by an input of heat when welding, and the first and second flat face portions are formed so as to include all of a region, facing the cavity part, of the heat-affected portion.

12. The differential device according to claim 6, wherein the weld part is spaced from the fitting part in the axial direction, the cavity part is formed between the weld part and the fitting part so as to be sandwiched by the barrel part and the rim portion, a cavity-forming face portion, facing the cavity part, of an outer peripheral face of the barrel part has a first flat face portion that extends radially inward from the inner end in the axial direction of the weld part and is substantially orthogonal to the predetermined axis, a cavity-forming face portion, facing the cavity part, of an inner peripheral face of the rim portion has a second flat face portion that extends radially outward from the inner end in the axial direction of the weld part and is substantially orthogonal to the predetermined axis, the barrel part and the rim portion each have, in an area around the weld part, a heat-affected portion that is hardened by an input of heat when welding, and the first and second flat face portions are formed so as to include all of a region, facing the cavity part, of the heat-affected portion.

13. The differential device according to claim 7, wherein the ring gear has a tooth shape such that the ring gear receives a thrust load in the axial direction due to the gear portion and the drive gear meshing with each other, the cavity-forming face portion of the outer peripheral face of the barrel part has the first flat face portion, a first curved face portion with a recess shape connected to the first flat face portion, and a second curved face portion with a recess shape connected to the first curved face portion, and when viewed in a longitudinal section of the barrel part containing the predetermined axis, the first curved face portion has an arc shape that has a smaller radius of curvature than that of the second curved face portion.

14. The differential device according to claim 8, wherein the ring gear has a tooth shape such that the ring gear receives a thrust load in the axial direction due to the gear portion and the drive gear meshing with each other, the cavity-forming face portion of the outer peripheral face of the barrel part has the first flat face portion, a first curved face portion with a recess shape connected to the first flat face portion, and a second curved face portion with a recess shape connected to the first curved face portion, and when viewed in a longitudinal section of the barrel part containing the predetermined axis, the first curved face portion has an arc shape that has a smaller radius of curvature than that of the second curved face portion.

15. The differential device according to claim 9, wherein the ring gear has a tooth shape such that the ring gear receives a thrust load in the axial direction due to the gear portion and the drive gear meshing with each other, the cavity-forming face portion of the outer peripheral face of the barrel part has the first flat face portion, a first curved face portion with a recess shape connected to the first flat face portion, and a second curved face portion with a recess shape connected to the first curved face portion, and when viewed in a longitudinal section of the barrel part containing the predetermined axis, the first curved face portion has an arc shape that has a smaller radius of curvature than that of the second curved face portion.

16. The differential device according to claim 10, wherein the ring gear has a tooth shape such that the ring gear receives a thrust load in the axial direction due to the gear portion and the drive gear meshing with each other, the cavity-forming face portion of the outer peripheral face of the barrel part has the first flat face portion, a first curved face portion with a recess shape connected to the first flat face portion, and a second curved face portion with a recess shape connected to the first curved face portion, and when viewed in a longitudinal section of the barrel part containing the predetermined axis, the first curved face portion has an arc shape that has a smaller radius of curvature than that of the second curved face portion.

17. The differential device according to claim 11, wherein the ring gear has a tooth shape such that the ring gear receives a thrust load in the axial direction due to the gear portion and the drive gear meshing with each other, the cavity-forming face portion of the outer peripheral face of the barrel part has the first flat face portion, a first curved face portion with a recess shape connected to the first flat face portion, and a second curved face portion with a recess shape connected to the first curved face portion, and when viewed in a longitudinal section of the barrel part containing the predetermined axis, the first curved face portion has an arc shape that has a smaller radius of curvature than that of the second curved face portion.

18. The differential device according to claim 12, wherein the ring gear has a tooth shape such that the ring gear receives a thrust load in the axial direction due to the gear portion and the drive gear meshing with each other, the cavity-forming face portion of the outer peripheral face of the barrel part has the first flat face portion, a first curved face portion with a recess shape connected to the first flat face portion, and a second curved face portion with a recess shape connected to the first curved face portion, and when viewed in a longitudinal section of the barrel part containing the predetermined axis, the first curved face portion has an arc shape that has a smaller radius of curvature than that of the second curved face portion.

* * * * *